(12) United States Patent
Jutras

(10) Patent No.: US 9,337,720 B2
(45) Date of Patent: May 10, 2016

(54) SWITCHING POWER SUPPLY STARTUP CIRCUIT HAVING NORMALLY ON EMITTER-SWITCHED CURRENT SOURCE

(71) Applicant: BEL FUSE (MACAO COMMERCIAL OFFSHORE) LIMITED, Andar H-K, MO (US)

(72) Inventor: Mark Jutras, Upton, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 135 days.

(21) Appl. No.: 14/193,014

(22) Filed: Feb. 28, 2014

(65) Prior Publication Data
US 2015/0194875 A1    Jul. 9, 2015

Related U.S. Application Data

(60) Provisional application No. 61/923,870, filed on Jan. 6, 2014.

(51) Int. Cl.
*H02M 1/36* (2007.01)
*H02M 3/335* (2006.01)
*H02M 1/00* (2006.01)

(52) U.S. Cl.
CPC ........ *H02M 1/36* (2013.01); *H02M 2001/0006* (2013.01)

(58) Field of Classification Search
CPC ... H02M 1/36; H02M 3/335; H02M 3/33507; H02M 7/517; H02M 2001/0006; G05F 1/468

USPC ............................................ 363/49; 323/901
See application file for complete search history.

(56) References Cited

U.S. PATENT DOCUMENTS 7,443,702 B2    10/2008  Yang et al.
7,525,819 B2 *  4/2009   Choi ........................ H02M 1/36
                                                        323/901

(Continued)

OTHER PUBLICATIONS

Hao and Xingbi, "A novel high voltage start up circuit for an integrated switched mode power supply," Journal of Semiconductors, vol. 31, No. 9 (2010).

(Continued)

*Primary Examiner* — Gary L Laxton
(74) *Attorney, Agent, or Firm* — BainwoodHuang

(57) ABSTRACT

A power converter startup circuit establishes an operating voltage for control circuitry during startup and is then disabled to reduce no-load power dissipation. The startup circuit has a normally on characteristic to automatically provide startup charging current for a startup capacitor. The control circuitry begins operating as the startup capacitor voltage reaches an operating value, and it generates an inhibitory signal that disables the startup circuit to stop the startup charging current and reduce power dissipation. The normally on characteristic is achieved by an emitter switched current source employing a normally on device such as a depletion-mode J-FET. A resistor divider network provides both biasing for the startup current source and a point of monitoring the power supply input voltage during steady state operation.

16 Claims, 11 Drawing Sheets

(56) References Cited

U.S. PATENT DOCUMENTS

| | | | |
|---|---|---|---|
| 7,924,581 B2* | 4/2011 | Hsu | H02M 1/36 323/901 |
| 9,106,149 B2* | 8/2015 | Dunipace | H02M 1/36 |
| 2007/0058398 A1 | 3/2007 | Yang et al. | |
| 2007/0236970 A1* | 10/2007 | Yang | H02M 1/36 363/49 |
| 2010/0103705 A1 | 4/2010 | Fang et al. | |
| 2010/0259952 A1* | 10/2010 | Zhu | G02M 1/36 363/20 |
| 2012/0163047 A1 | 6/2012 | Kubota et al. | |
| 2013/0127431 A1 | 5/2013 | Ansari | |

OTHER PUBLICATIONS

Jung and Kim, "A Low Stand-by Power Start-up Circuit for SMPS PWM," Proceedings of the Great Lakes Symposium on VLSI, pp. 251-254 (2012).

Extended European Search Report for European Application No. EP15150212.7 mailed from the European Patent Office on Jun. 3, 2015, 8 pages.

* cited by examiner

SWITCHING POWER SUPPLY STARTUP CIRCUIT HAVING NORMALLY ON EMITTER-SWITCHED CURRENT SOURCE

SUMMARY

When input power is initially applied to a switching power supply, it is necessary to deliver energy to control circuits for the purpose of starting operation. The circuitry used for this purpose is commonly referred to as the "startup circuit". Because the power supply is not yet generating output power during startup, the startup circuit obtains power from the input in some manner. One of the challenges in a switching power supply is providing the initial energy to power the control circuitry when the operating voltage limits for the control devices are far below the input voltage range of the power supply. This problem exists for DC/DC converters that receive input power from 24V or 48V nominal DC sources, for example. This is also a consideration in AC/DC power supplies that operate from input voltages that can be as high as 305 VAC and in typical applications range from 90 VAC to 264 VAC.

In order to start a switching power supply when the input voltage is large relative to the normal operating voltage of primary-side-referenced control circuits, a capacitor can be charged from the input source through either a resistor or a current source. A circuit monitors the capacitor voltage and turns on the control circuitry when the capacitor voltage reaches approximately the upper operating voltage of that circuitry. The control circuitry once enabled draws energy from the charged capacitor. When startup completes and normal operation commences, the normal operating circuitry of the power converter can supply the energy required to maintain the voltage across this startup capacitor to a value within the operating limits of the control circuitry.

The circuitry that monitors the startup capacitor voltage and turns on the control circuitry may require only a small current (e.g., 500 uA to 1 mA) during startup, and the resistor or current source that feeds the startup capacitor is sized to provide this current at a minimum input voltage that is present during startup. This sizing can result in much higher power dissipation by the circuitry at the larger maximum input voltage occurring during normal operation. Moreover, this higher power dissipation occurs irrespective of the output loading of the power converter, i.e., whether the converter is online and providing power to a load or is offline or "standby" and not providing power to a load.

Offline power supplies are subject to market or regulatory requirements that place limits on no-load power loss. Thus, it is desirable to reduce no-load power losses as much as possible, including losses attributable to startup circuitry such as described above.

A disclosed power converter includes a startup circuit that achieves reduced no-load power loss while providing the desired function of establishing an operating voltage for control circuitry during a startup period. The startup circuit has a normally on characteristic such that it automatically provides startup charging current for a startup capacitor once the input voltage has risen sufficiently high, without operation of any separately powered control circuitry. The control circuitry begins operating as the startup capacitor voltage reaches an operating value, and it generates an inhibitory signal that disables the startup circuit, stopping the flow of the startup charging current and reducing the power dissipation of the startup circuit to a desired low value. The normally on characteristic is achieved through use of an emitter switched current source employing a normally on switching device, such as a depletion-mode junction field-effect transistor (J-FET). Such a device has a source-drain channel that conducts current in the absence of a control voltage on the gate of the device, and this feature is exploited for use during startup when control circuitry is not yet operating. Additionally, the source-drain channel can be cutoff by application of a sufficiently high control or bias voltage to the gate of the device, and this feature is exploited for use after startup to prevent current flow and reduce power dissipation by the startup circuit during subsequent normal operation.

Thus a J-FET is a good candidate as a switch device used to enable and disable a startup current source. When power is initially applied and no bias voltages are available from the power converter, a J-FET device can be used to establish the flow of startup capacitor charging current. When the control circuitry comes alive and the power converter is operational, a low voltage from the control circuitry can be applied to the gate of the J-FET to turn it off and disable the charging current. One issue with readily available J-FETs, however, is relatively low voltage rating (e.g., less than 50V) which is far below the typical voltages that need to be switched for many startup current source applications. Thus, in a disclosed startup circuit a J-FET is used as a switch in of an emitter-switched current source employing a bipolar transistor as the main current-control element. This configuration reduces the voltages experienced by the J-FET even in higher-voltage applications.

Another aspect of a disclosed circuit is a convenient dual use of a resistive divider network both to bias the emitter-switched current source and to provide a sufficiently low sensing voltage proportional to the input voltage for use by the control circuitry during normal operation. Since the input voltage is typically in excess of the voltage rating of the control circuit elements a voltage divider is used to generate a signal that is proportional to the input voltage but scaled to a range that does not exceed the control circuit voltage limits. The resistors that are used to derive this circuit element are sized to have an insignificant impact on no load power loss. Consequentially the divided down input voltage used as a monitoring signal is normally far below the voltage ratings of available J-FETs. However, it is usable with the disclosed current source using an emitter-switched configuration. Thus, emitter switching provides the advantage of using a depletion mode device as a switch in the startup current source without exceeding the voltage limitations of readily available, low cost, discrete J-FET devices. Thus a disclosed startup circuit combines the resistor divider that generates a monitored signal proportional to the input voltage with an emitter-switched startup current source using a depletion mode J-FET in series with the emitter of a higher voltage NPN transistor. The circuit provides an input voltage monitoring signal during steady state operation, while also disengaging the startup current source without additional circuit losses. The emitter-switched bipolar transistor could alternatively be controlled with a series MOSFET or a series bipolar transistor in other embodiments.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
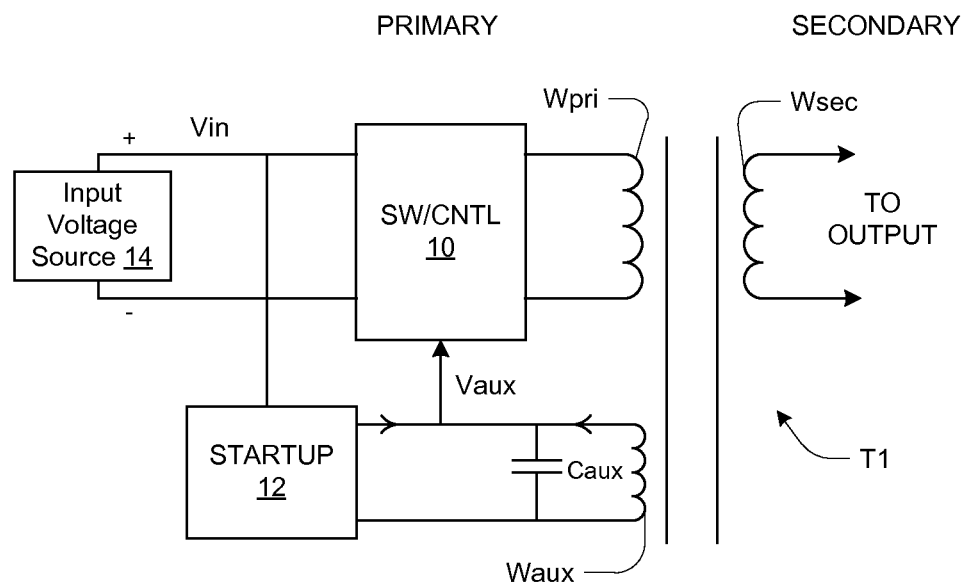
FIG. 1 is a schematic block diagram of a power supply.

FIG. 1 is a schematic block diagram of a portion of a switching power supply. It includes switching and control (SW/CNTL) circuitry 10, a power transformer T1, a startup circuit 12, and optionally an input voltage source 14. The transformer T1 has main primary and secondary windings Wpri and Wsec, as well as a third or "auxiliary" winding Waux connected to a capacitor Caux. The switching and control circuitry 10 receives a DC voltage Vin as well as a voltage Vaux developed on the capacitor Caux. The voltage Vin is provided by the input voltage source 14 when present, and otherwise it may be an input from a separate voltage source.

Pertinent operation of the power supply is divided into two periods, an initial startup period in which Vin is rising from zero to a normal operating value, and a subsequent steady-state operating period in which Vin is at its normal operating value and the power supply is providing a steady DC output voltage to separate powered circuitry (not shown). The switching and control circuitry 10 includes circuitry (not shown in FIG. 1) that receives its operating power from the Vaux input; examples are described below. During steady-state operation, the combination of the winding Waux and capacitor Caux function as a simple power source for this circuitry. During at least an initial part of the startup period, no or little current is provided to the main primary winding Wpri and therefore no or little power is available via the winding Waux. The startup circuit 12 operates during this period along with Caux as the power source, until operation has proceeded to the point that the normal steady-state mechanism employing winding Waux is available and becomes operative.

Figure 2:
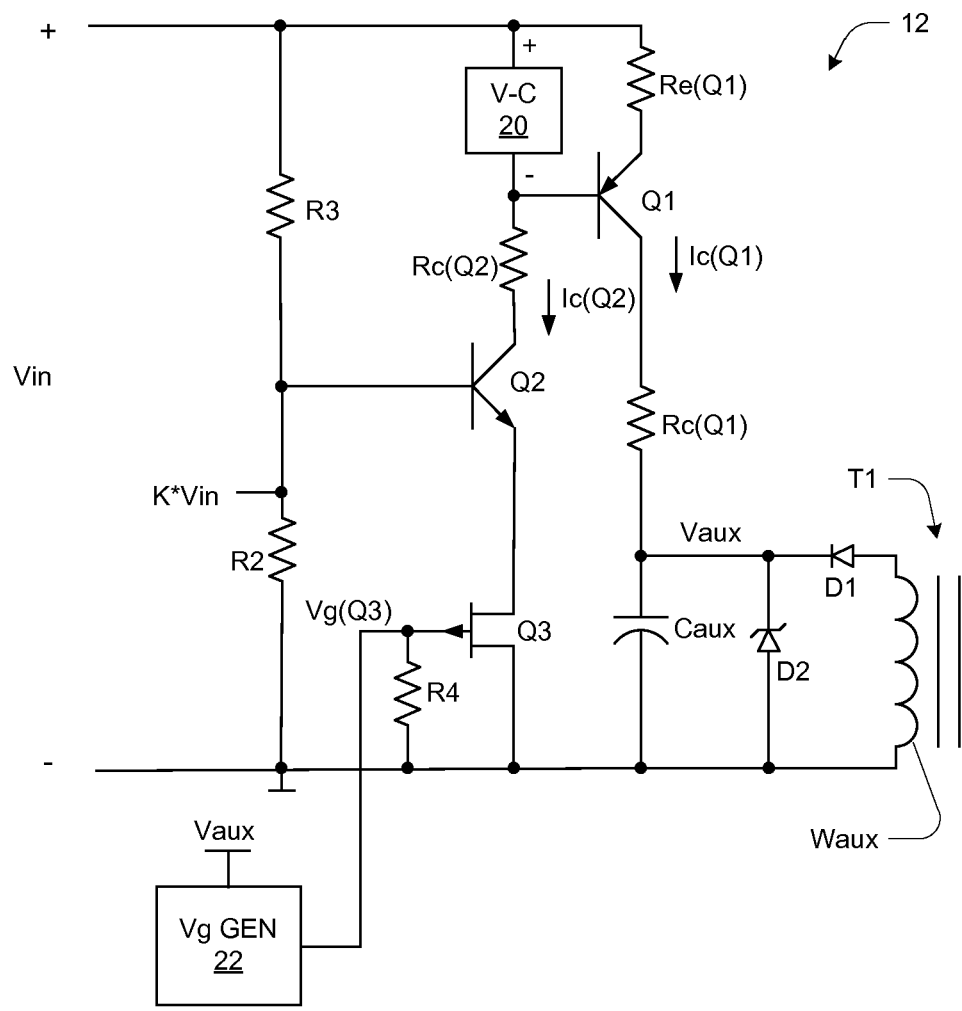
FIGS. 2 and 3 are schematic diagrams of alternative implementations of a startup circuit.

FIG. 2 shows the startup circuit 12 according to one embodiment. Its main purpose is to generate an unregulated supply voltage Vaux usable by the switching and control circuitry 10 (FIG. 1) during an initial startup period of operation before all normal operating voltages have been established. Vaux is generated by supplying a charging current Ic(Q1) to the capacitor Caux, which occurs in response to another current Ic(Q2) that flows during an initial part of the startup period. Detailed operation is described below. One important feature is provided by a normally on transistor Q3, which may be implemented as a depletion-mode junction FET (J-FET) for example. Q3 conducts during startup to allow generation of Ic(Q2), and at the end of startup it is rendered non-conducting by application of an inhibitory control signal in the form of a positive gate voltage Vg(Q3) from a Vg generator (Vg GEN) 22. This effectively disables the startup circuit 12, reducing its power dissipation and improving overall efficiency of the power supply accordingly.

Overall, the transistors Q1-Q3 and related circuitry forms a startup current source that pulls power from the input source to generate the charging current Ic(Q1) for the storage capacitor Caux. In the illustrated configuration the startup current source includes two sub-level current sources—an emitter-switched current source formed by Q2, Q3 and related circuitry that generates Ic(Q2), and a second current source (referred to as an output current source) that responds to Ic(Q2) to generate the charging current Ic(Q1). In this configuration the current Ic(Q2) may be seen as an enabling current that enables Q1 to conduct the charging current Ic(Q1).

Another feature of the startup circuit 12 is the ability to measure the input voltage Vin by sensing the voltage at the junction of a resistive divider circuit formed by the resistors R2 and R3. This voltage is shown as K*Vin, where K is equal to R2/(R2+R3). It will be appreciated that this relationship does not actually hold during startup when Q2 is conducting base current through R3. However, at the end of startup when Q3 is shut off, Q2 also stops conducting and its base current drops to a very small parasitic value. Assuming sufficiently small values for R2 and R3, this base current is swamped by the current through R2 and R3, and the above relationship is valid.

In the illustrated arrangement, Q3 is a P-Channel depletion mode J-FET. A depletion mode FET is on (conducting) when zero volts is applied to its gate, and is turned off when a voltage in excess of a cutoff voltage is applied to its gate. At the very beginning of startup operation when Vin is equal to zero, Vg(Q3) has zero volts applied and Q3 behaves as if it were a resistor connected from the emitter of Q2 to the return potential. Once the voltage on the base of Q2 becomes high enough to establish current flow through Q2's base-emitter junction, begins conducting. This will establish current flow through a voltage-creating (V-C) element 20 connected between Vin and the base of Q1. Once the voltage created by the V-C element 20 is sufficient to establish base-emitter current in Q1, then collector current flows in Q1. This collector current is proportional to the voltage across Re(Q1), which is equal to the voltage across the V-C element 20 minus the base-emitter voltage drop ($V_{BE}$) for the conducting Q1. The Q1 collector current Ic(Q1) flows in a path that allows it to charge Caux.

When Caux is charged to a sufficiently high voltage that allows startup of the power converter, current flows in the primary winding Wpri (FIG. 1) and by magnetic coupling in the auxiliary winding Waux as well. This current maintains the voltage Vaux across Caux as part of steady state operation of the power supply. Additionally, at this point the Vg generator 22 generates an inhibitory control signal in the form of a non-zero gate voltage Vg(Q3), which is supplied to the gate of Q3 in order to turn Q3 off. When Q3 is off, no current flows through Q2, and thus Q1 is off and the startup current used to charge Caux is terminated. With the startup current disabled, no power loss from the startup circuit exists other than small losses from the input voltage monitoring divider R2, R3.

The voltage divider consisting of R2 and R3 puts a voltage on the base of Q2 that is proportional to the input voltage Vin when Q3 is off. When Q3 is conducting this same voltage is clamped to a maximum value of the $V_{BE}$ voltage of conducting Q2 plus the voltage drop across conducting Q3. For Q2 to turn on when Q3 is on, the voltage on the base of Q2 must be higher than the VBE voltage for Q2. Q2's base voltage must also be sufficient to provide the voltage across Q3 required to maintain the desired Ic(Q2) current at the maximum Q3 on resistance. A minimum divided down voltage of approximately 1V will satisfy the ability to properly turn on Q2 and provide desired Ic(Q2) current under most practical applications of this circuit. The signal K*Vin is only proportional to Vin when Q3 is turned off and no Q2 base-emitter current is flowing. This will be the condition after power supply startup is established since Q3 will be turned off during steady state operation. Thus, K*Vin can be used as a proxy for Vin during steady state operation.

A bipolar transistor or an enhancement mode MOSFET could alternatively be used as the switching transistor Q3 to obtain the benefits of the emitter-switched configuration. However, the J-FET implementation is a practical choice because of its normally on characteristic (conducting in the absence of gate voltage). With the addition of a voltage divider from Vin to the base of a BJT or to the gate of a MOSFET the emitter-switched implementation could also be configured around those devices. Such implementations might be useful in applications having lower input voltages.

Figure 3:
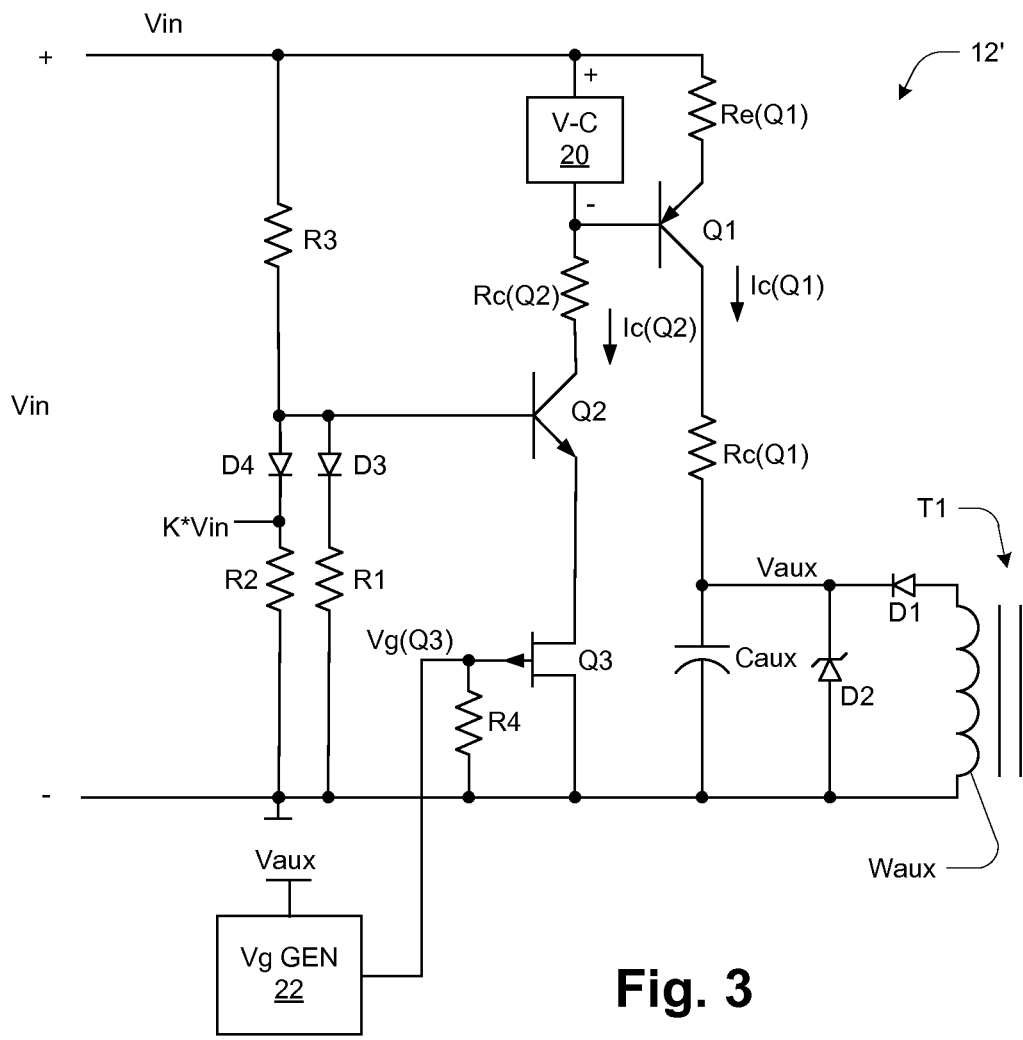

FIG. 3 shows an alternative embodiment in which a voltage divider is established with R3 and R1//R2 that puts a voltage on the base of Q2 that is much lower than Vin and is biased up by a diode drop established by diode D3. D3 is used in the case that Vin is divided to a value less than a Q2 VBE voltage drop at the minimum operating input voltage. This arrangement is used to satisfy two competing design goals. First, to limit steady state power losses in offline AC/DC applications, it may be desirable to use a value for R3 in excess of a few mega-ohms. However, the signal K*Vin is supplied to an A/D converter channel whose input impedance may be less than 10K ohms for accurate sensing. In that scenario, the divided down voltage across R1 at the minimum input voltage would be too low for Q2 to turn on. D3 is intended to increase the voltage on the base of Q2 to a workable level, while D4 subtracts the error introduced by D1 from the input voltage monitoring signal K*Vin. The added diode drop on the base of Q2 will be sufficient to turn Q2 on when the emitter of Q2 is essentially connected to the return potential thru Q3. The voltage across R2 will be a diode drop below the voltage on the base of Q2, and the voltage K*Vin across R2 is essentially proportional to Vin when Q3 is tuned off and no Q2 base-emitter current is flowing. This is the intended condition after power supply startup is established.

The following are specific values of circuit components usable in an embodiment according to FIG. 2:
R2 10K
R3 1.21M
R4 100K
Q1 PBHV9050T
Q2 PMBTA45

The following are specific values of circuit components usable in an embodiment according to FIG. 3:
R1 10K
R2 10K
R3 6 M
R4 100K
Q1 PBHV9050T
Q2 PMBTA45

Figure 4:
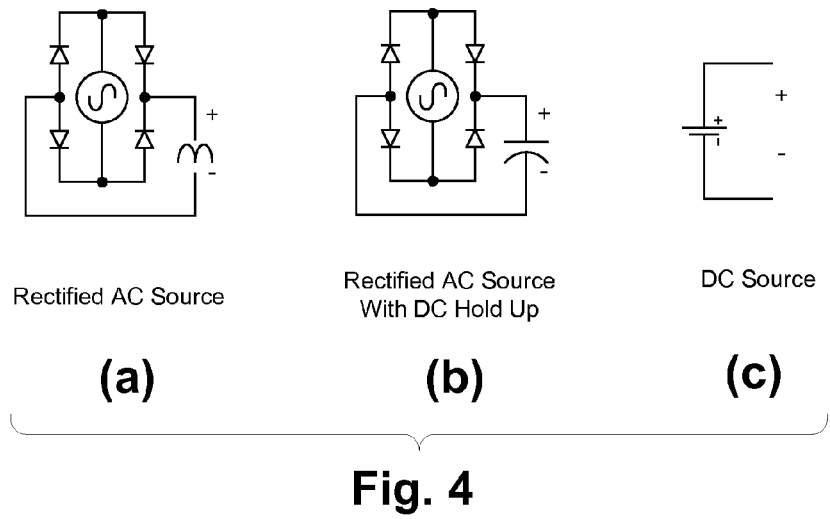
FIG. 4 is a set of schematic diagrams of alternative DC sources.

FIG. 4 shows three different types of input voltage source 14 with which the startup circuit of FIG. 2 or FIG. 3 can be used. Because of the use of the normally on device Q3 and the attendant lack of a need for a bias voltage, the startup circuit 12 is able to produce startup current through a significant portion of a rectified sine wave. The configuration of FIG. 4(a) is applicable in a power supply that employs active power factor correction (PFC), so the startup circuit can provide startup voltage for a controller used for active PFC control. In the PFC application, the auxiliary winding Waux can be a winding on a boost choke or a winding on a transformer of the switching power supply that the PFC circuit feeds. The configuration of FIG. 4(b) is a DC source generated by rectification of an AC voltage input and a hold up capacitor. The configuration of FIG. 4(c) is just a DC source.

Figure 5:
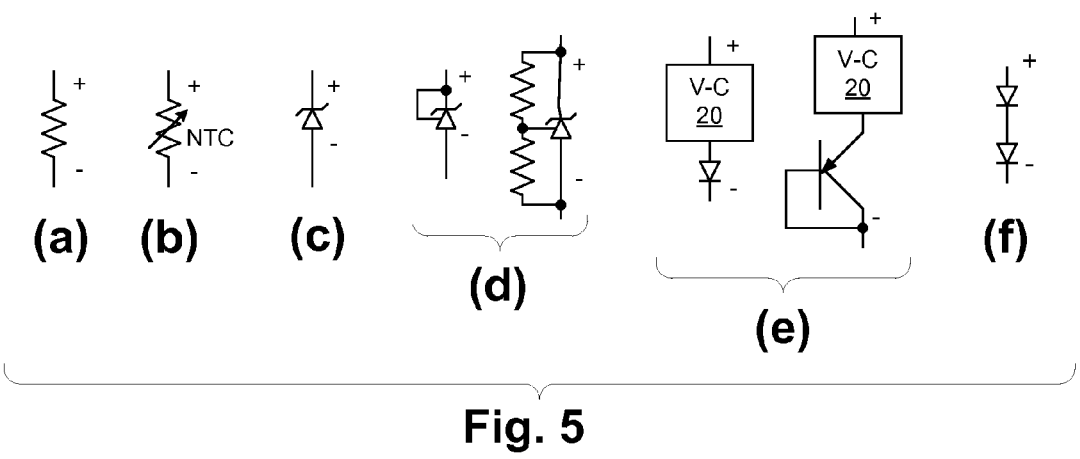
FIG. 5 is a set of schematic diagrams of alternative voltage-creating elements.

FIG. 5 shows different types of voltage creating (V-C) elements 20 and surrounding circuitry that may be used in conjunction with Re(Q1) to determine the value of Q1's collector current. FIG. 5(a) shows a simple resistor, which is convenient and inexpensive but has the disadvantage of producing a voltage drop and thus a startup current that increases with Vin. This would result in a startup time that decreases with input voltage. FIG. 5(b) shows a negative-temperature-coefficient (NTC) resistor whose resistance decreases in value with an increase in temperature. This would be a possible consideration if it were desired to lower the startup current at higher temperatures in order to reduce stress.

It is noted that an NTC resistor or device is one whose pertinent characteristic (e.g., resistance) varies significantly as a function of temperature, and in particular as an inverse function of temperature. Thus a typical NTC coefficient might be on the order of −1% to −10%, for example, meaning that the resistance decreases by that proportional amount per degree C. (e.g., a 10K resistance is reduced to 9.0K for a 10-degree temperature rise when the NTC is −1%). Similarly, a PTC resistor or device has a coefficient of similar magnitude but opposite sign, so its resistance increases correspondingly with temperature. This is in contrast to regular resistors or devices that exhibit much lower degrees of temperature dependence. For example, a typical thin-film resistor might have a temperature coefficient on the order of $10^{-4}$ that provides little or no observable effect on circuit operation over a normal operating temperature range. NTC and PTC devices respond much more dramatically to temperature changes to cause more pronounced and desired changes to circuit operation.

If a startup current that is independent of input voltage is required, then a Zener diode can be used as shown in FIG. 5(c). However, one of the potential pitfalls of a Zener diode is the current required to get a predictable breakdown voltage across the device. Most Zener diodes require 1 ma to 5 ma of current to establish a predictable clamp voltage. That would require Rc(Q2) to be relatively small and as a result this resistor will be subjected to excessive power loss stress when conducting current and thus would need to be sized properly. This may not be an issue with this configuration because this would be a pulsed current event since the goal of the circuit is to terminate that current flow under steady state conditions.

If it is determined that using a Zener diode is not acceptable for a given application, then a voltage reference such as a Texas Instruments TLV431 could be used—two variants of this alternative are shown in FIG. 5(d). A device equivalent to a TLV431 only requires 100 uA of cathode current to establish a predictable voltage drop reducing the burden on Rc(Q2). If precise startup current is required, adding a diode in series the voltage creating element will cancel Q1's VBE drop placing a more precise representation of the voltage creating element across Re(Q1). FIG. 5(e) shows two variants of this configuration. A circuit as simple as two or more series diodes, as shown in FIG. 5(f), could also be used as a voltage creating element 20. The first diode creates a voltage drop to cancel Q1's VBE while the additional diode(s) result in a net voltage across Re(Q1) creating current flow.

Figure 6:
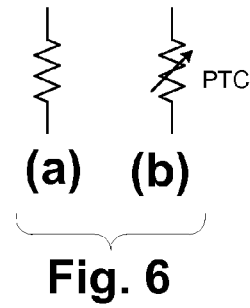
FIG. 6 is a set of schematic diagrams of alternative emitter resistors.

FIG. 6 shows two alternative implementations for the resistor Re(Q1), which is the resistive element that provides the emitter current path for Q1. Q1's collector current is approximately equal to the voltage applied across this resistor divided by its resistance value. FIG. 6(a) shows a simple resistor—a good choice for some implementations. An alternative shown in FIG. 6(b) is a resistor with a positive temperature coefficient (PTC), to provide a startup current that decreases with temperature but is essentially constant relative to varying input voltage a PTC resistor could be used as this element. In that case the PTC would be applied in conjunction with a configuration from one of FIGS. 5(d), 5(e) and 5(f) for the V-C element 20. The resistance of a PTC resistor increases in value as temperature increases.

Referring again to FIG. 2, Rc(Q1) is used to distribute the power loss in the Ic(Q1) path when Q1 is enabled. Rc(Q1) also limits current in that path in the event that Q1 fails in a short-circuiting manner, to prevent catastrophic failure of the components connected across Caux. Rc(Q1), Rc(Q2), and R3 are shown as single resistive elements in FIG. 2. Under certain applications Vin may be such that the voltage drop across these elements is in excess of their voltage rating. In such situations these resistive elements can be replaced with multiple resistors in series in order to distribute the dropped voltages such that no single resistor is operated in excess of its voltage rating. Using multiple series resistors may also be a consideration relative to power dissipation or pulse power ratings.

Figure 7:
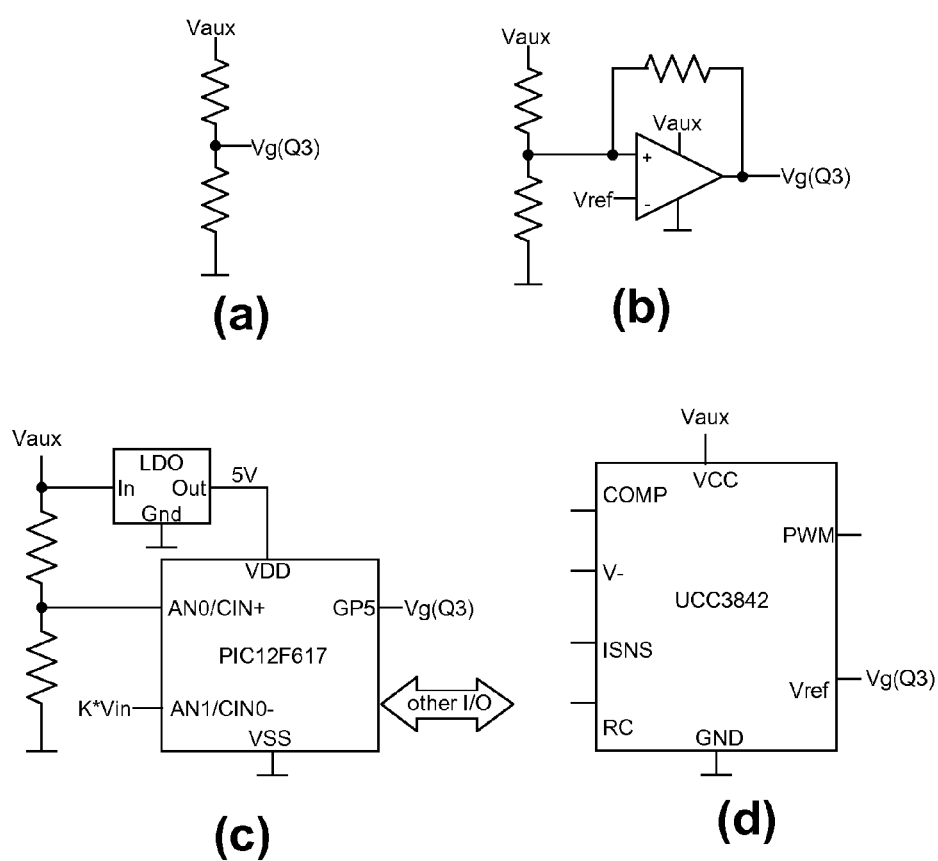
FIG. 7 is a set of schematic diagrams of alternative gate-voltage generators.

FIG. 7 shows some alternative ways in which the control signal Vg(Q3) of FIG. 2 can be generated, specifically some practical methods for generating the signal that each turn Q3 off after Vaux reaches a desired voltage. The arrangement of FIG. 7(a) is a resistor voltage divider that will establish a voltage on the gate of Q3 that begins to cutoff Q3 current flow as Caux charges. This is a simple circuit that will work in some implementations but has the disadvantages of no hysteresis and also creates an analog cutoff rather than a digitally switched cut off. With the analog cut off Q3 will not be abruptly turned off but rather slowly turned off as increasing voltage on the gate of Q3 pinches off the junction as the voltage across Caux increases. Both of those disadvantages can be corrected by using the comparator configuration shown in FIG. 7(b).

One of the advantages of the disclosed startup circuit is the ability to provide startup energy to a microcontroller. A microcontroller provides the ability to generate optimum control of the turn off signal, and can be configured for this purpose as shown in FIG. 7(c) (microcontroller shown as "PIC12F617"). When the voltage Vaux reaches a value that establishes operating voltage for the microcontroller, the microcontroller can manage the turn off for Q3. A voltage K*Vin proportional to the startup voltage is monitored by either an analog to digital converter or a comparator within the microcontroller. A software algorithm is then used to decide when to terminate the startup current source by applying voltage to the gate of Q3 through a digital output.

As another possible configuration, a traditional power supply control IC with start-up hysteresis can be used to turn off Q3. In the arrangement of FIG. 7(d), a Texas Instruments controller UC3842 is shown receiving power from the energy stored in Caux. When Vaux reaches a voltage that turns on the UC3842, its reference pin will jump to 5V and this can be used as the voltage to turn off Q3.

Figure 8:
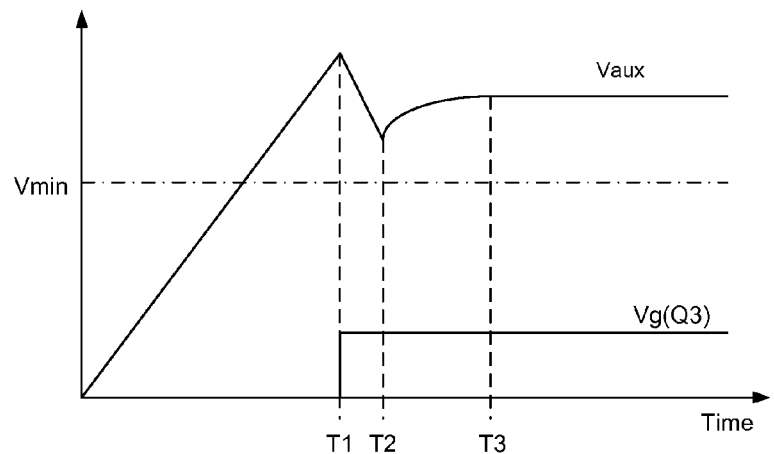
FIGS. 8-10 are waveform diagrams of signals in the power supply during startup.

FIG. 8 depicts the voltage Vaux across Caux during normal operation of a switching power supply. From the application of fixed input voltage at time t=0 the voltage Vaux rises as Caux is charged with a constant current. At time T1 the Vg generator 22 controlling Q3 determines that Vaux has reached its desired value, so Vg(Q3) is driven to a voltage capable of turning Q3 off. At that point the power supply's control circuit is enabled and it draws energy from Caux causing Vaux to begin to decrease as energy is removed. At time T2, Vaux has not decreased below the minimum operating voltage for the control circuitry, Vmin, and the auxiliary winding Waux has become capable of supplying energy to the control circuitry. At this point the delivered energy brings Vaux up to its nominal operating value sustaining continuous operation of the power supply.

Figure 9:
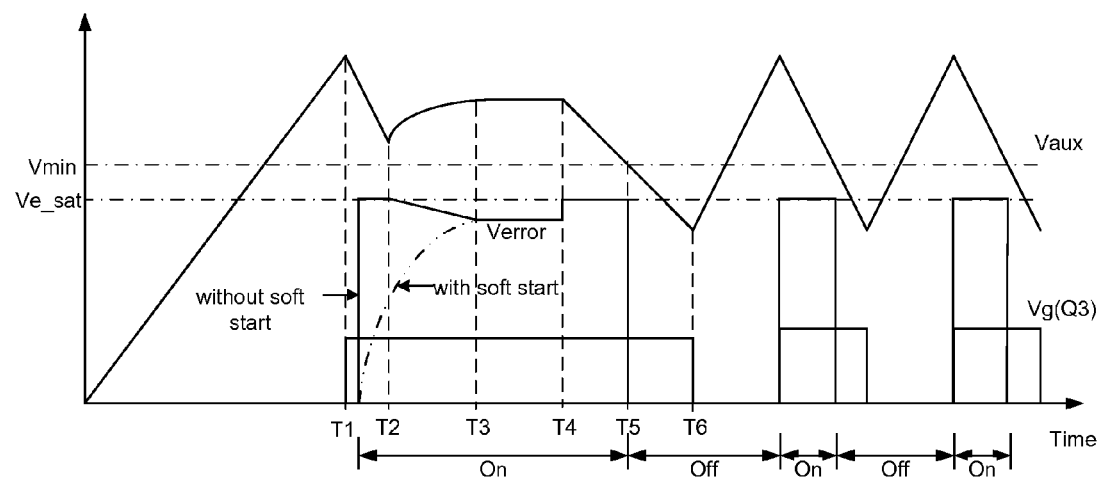

FIG. 9 depicts operation of the startup circuit when an overload fault occurs on one of the outputs of the switching power supply controlled by a circuit powered from Vaux. An additional signal, Verror, is drawn on this graph. Verror is the error voltage for the switching power supply and is used to set operating duty cycle to maintain the desired output voltage. If the control of the power supply is digital rather than analog there is an equivalent operating parameter that exists in the control software that can be queried for similar behavior. In the analog control approach this signal is generated by comparing the controlled output voltage to a reference with an amplifier that has sufficient gain. In the digital control approach it is a calculated parameter. In the case of an isolated power supply with analog control this signal is coupled to the primary side through an isolation device such as an optocoupler. In the event of an overload condition the output voltage will drop below the reference value and the Verror signal will increase to its saturation level indicated as Ve_sat. If both of those conditions exist the control of Q3's gate is designed so that Q3 is kept off until a desired trough is reached. Sometime prior to that point the switching power supply will turn off. At that trough point Q3 is allowed to turn on so that energy in Caux can be replenished. The power supply will attempt a normal startup. If the fault condition is removed the power supply will restart and re-establish normal operation. If the fault remains the power supply will continue the turn on and turn off pattern which is intended to reduce the average stresses during the fault condition. This mode of protection is often referred to as hiccup. This circuit allows hiccup mode which can be managed by the control of Q3's gate.

One advantage of using the disclosed startup circuit is the ease of turning on and off the startup current source to reduce power dissipation when it is not needed. When Q3 is controlled with a microcontroller the ease of turning on and off the startup current source can be used as an advantage in solving a problem that commonly occurs with regulated power supplies that employ an auxiliary winding to generate Vaux during steady state operation. This auxiliary winding is not regulated but rather coupled to a winding that produces a regulated voltage. Since the auxiliary winding is on the primary side and the regulated winding is typically on the secondary side safety requirements force the transformer (or coupled inductor) construction to be such that the coupling between these windings is compromised. At light loads the poor coupling can be such that the auxiliary winding is not capable of providing the energy required to keep Vaux above the minimum operating voltage of the control circuitry. This can be solved with the FIG. 2 circuit when it is controlled by a microcontroller that also monitors the error voltage used to set regulation.

Figure 10:
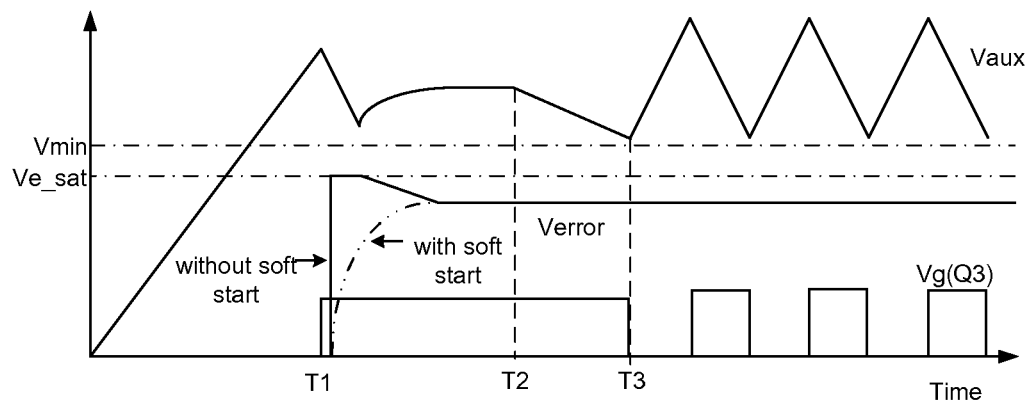

Referring to FIG. 10 a mode of operation that can be executed by a microcontroller is shown. The microcontroller can run software that distinguishes between allowing the mode of operation shown in FIG. 9 or forcing the mode of operation shown in FIG. 10 based on the relationship between Verr and Vaux. The mode of operation in FIG. 10 prevents Vaux from falling below a minimum value when the power supply should be sustaining its output. These can be determined by using Verror as a proxy as to whether the regulated output is in regulation which is the case when Vaux is not at its saturation level. The microcontroller can control the FIG. 2 circuit to behave as a repetitively pulsed current source to keep Vaux above a minimum threshold. This is not the primary intended use of the disclosed startup circuit but rather another possible operating mode.

Figure 11:
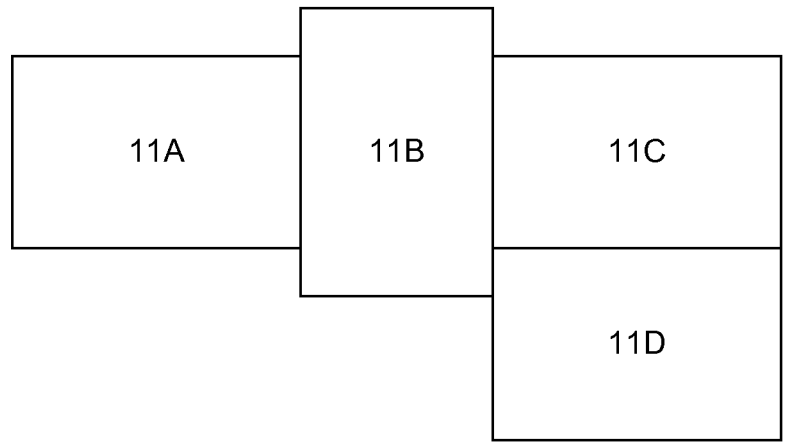
FIG. 11, consisting of parts 11A through 11D, is a schematic diagram of a switching power supply.
Figure 11A:
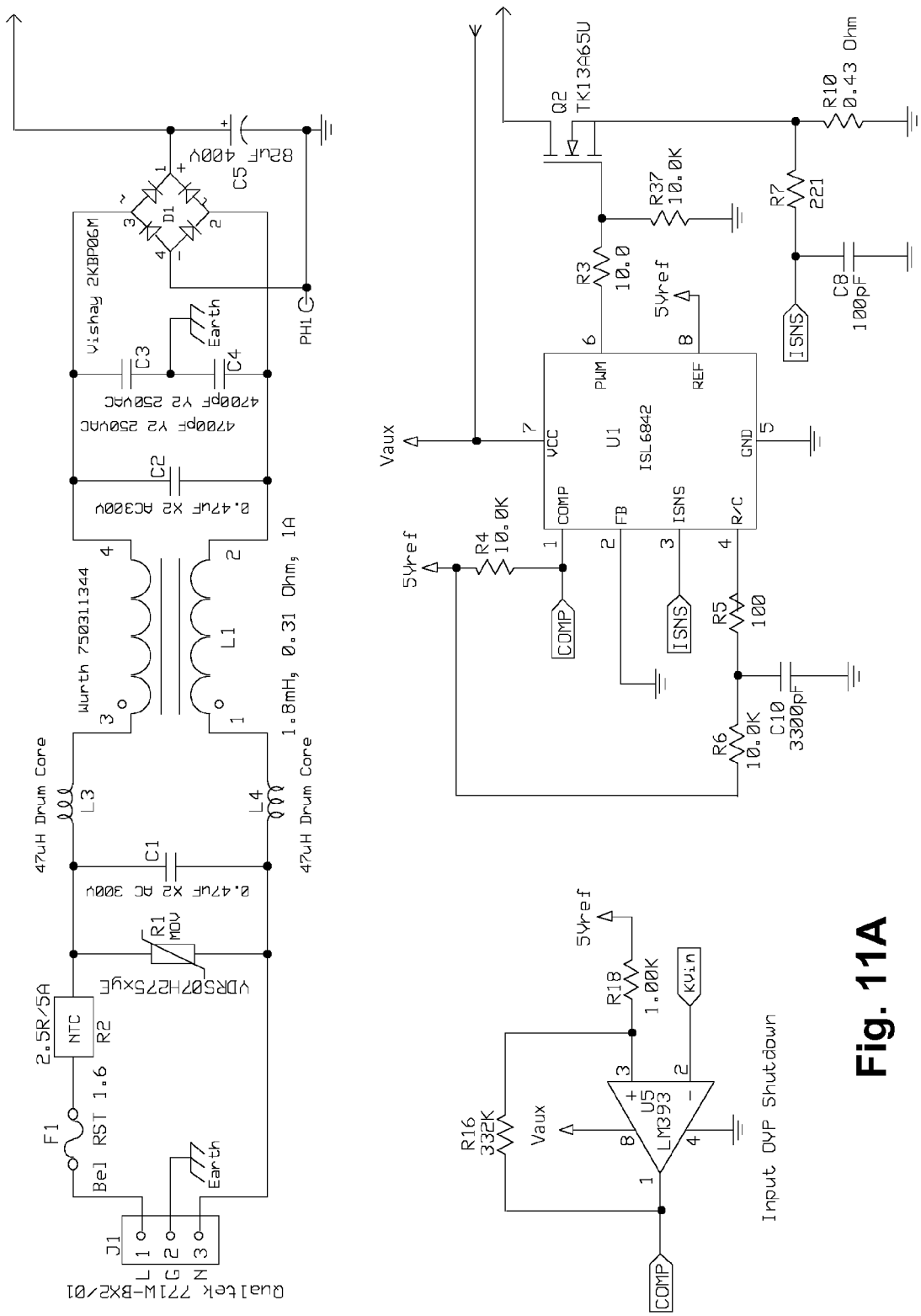
Figure 11B:
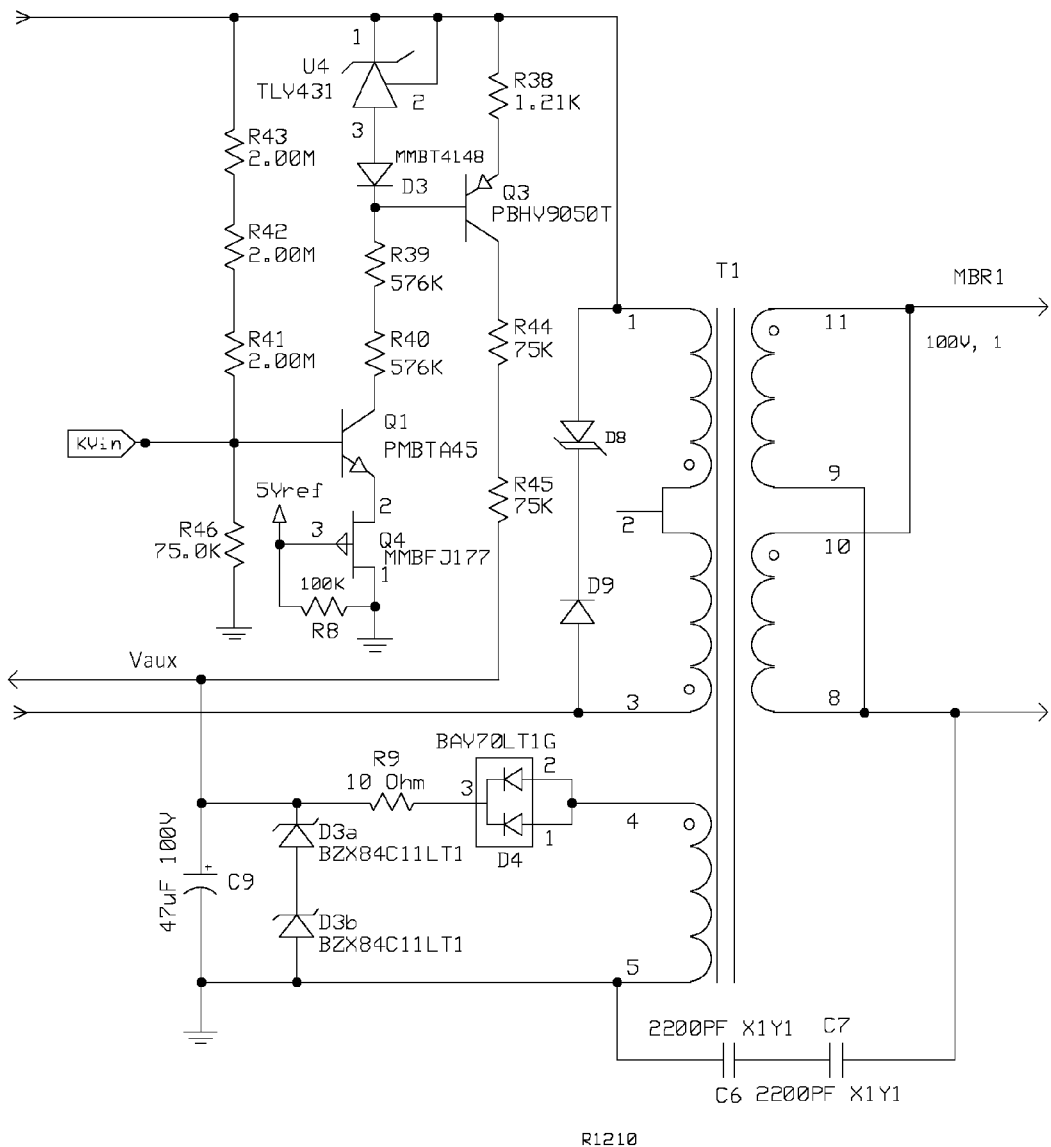
Figure 11C:
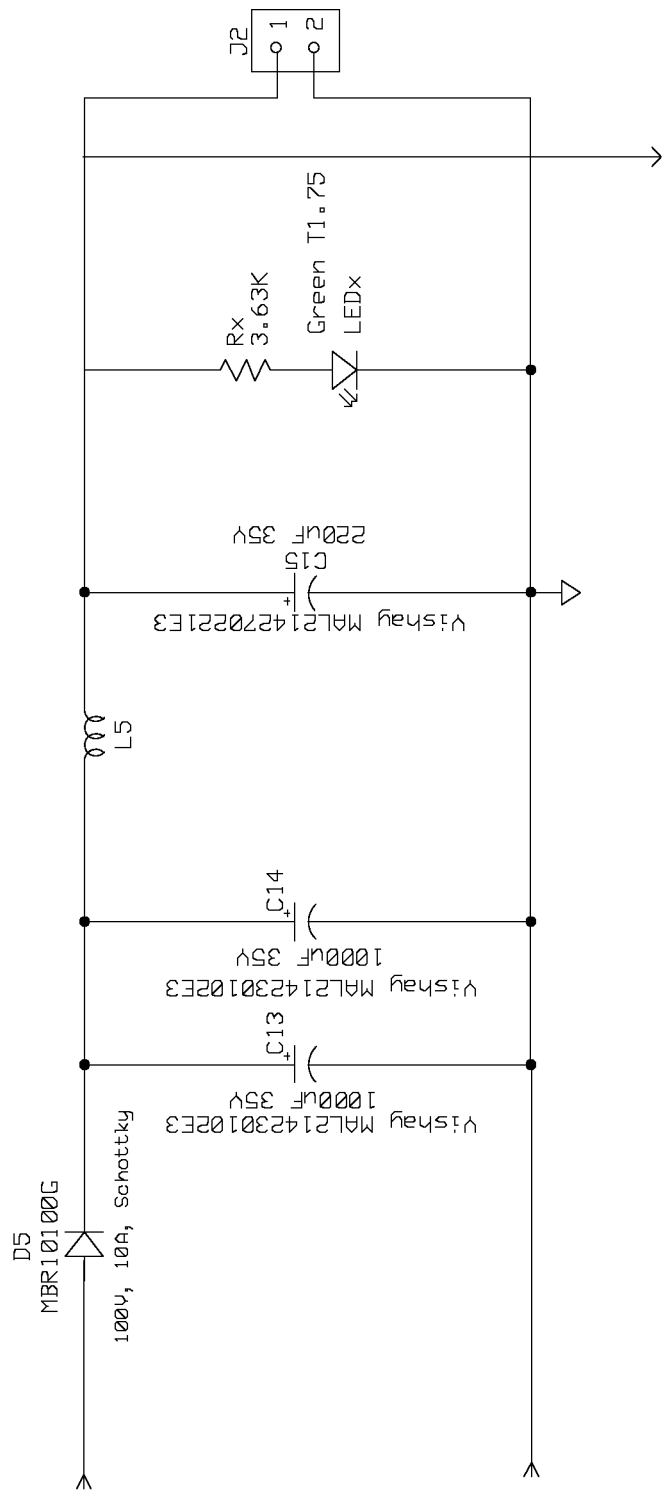
Figure 11D:
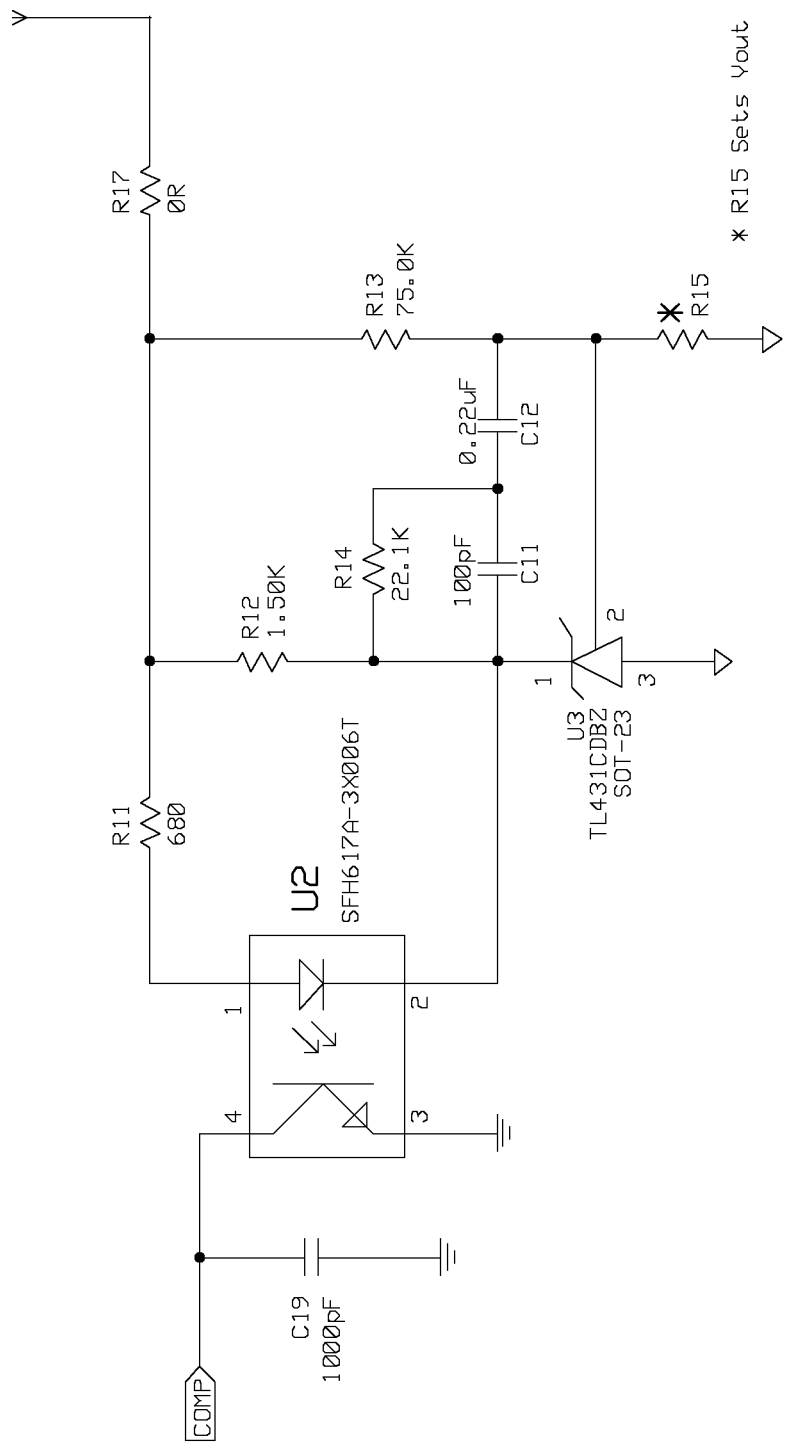

FIG. 11 is a detailed schematic diagram of an example power supply using a startup circuit in a way that provides a useful monitoring of Vin and takes advantage of a switched current source turn off to limit quiescent power loss after startup. In this design the startup circuit, shown primarily in part 11B of FIG. 11, is implemented using one set of the multiple options described above.

While various embodiments of the invention have been particularly shown and described, it will be understood by those skilled in the art that various changes in form and details may be made therein without departing from the spirit and scope of the invention as defined by the appended claims.

What is claimed is:

1. A switching power supply, comprising:
    a storage capacitor coupled to a power magnetic element to maintain a steady state value of an auxiliary voltage during steady state operation of the switching power supply, the steady state operation being preceded by a startup period in which an input-side DC voltage of the switching power supply rises from zero toward a steady state operating value;
    switching/control circuitry configured to couple energy from the input-side DC voltage to the power magnetic element during the steady state operation, the switching/control circuitry including powered control circuitry powered by the auxiliary voltage; and
    a startup circuit configured and operative during the startup period to generate a startup value of the auxiliary voltage to enable the powered control circuitry to establish the steady state operation, the startup circuit including (i) a startup current source coupled between the input-side DC voltage and the storage capacitor to provide charging current thereto based on the absence of an inhibitory control signal, the startup current source including an emitter-switched current source having a normally on switching transistor that conducts an enabling current in the absence of the inhibitory control signal and that does not conduct the enabling current in the presence of the inhibitory control signal, the enabling current controlling the delivery of the charging current by the startup current source, and (ii) a generator of the inhibitory control signal, the generator being configured and operative during the startup period to generate the inhibitory control signal in response to the auxiliary voltage reaching the startup value by charging action of the startup current source and to maintain the inhibitory control signal during subsequent steady state operation,
    wherein the startup current source includes an output current source that generates the charging current in response to the enabling current, and wherein the emitter-switched current source includes a bipolar transistor having an emitter in series with the normally on transistor, the bipolar transistor conducting the enabling current as collector current when the normally on transistor is also conducting.

2. The switching power supply according to claim 1, wherein the output current source includes a second bipolar transistor having a base-emitter junction being forward biased by the enabling current to enable the second bipolar transistor to conduct the charging current as collector current.

3. The switching power supply according to claim 2, wherein the output current source includes an emitter resistor at an emitter of the second bipolar transistor and a voltage-creating element at a base of the second bipolar transistor responsive to the enabling current to establish the forward biasing of the base-emitter junction of the second bipolar transistor, the voltage-creating element and emitter resistor having a predetermined relationship establishing a desired predetermined value of the charging current.

4. The switching power supply according to claim 3, wherein the voltage-creating element comprises a negative-temperature-coefficient resistor configured to reduce the value of the charging current with increasing temperature.

5. The switching power supply according to claim 3, wherein the emitter resistor comprises a positive-temperature-coefficient resistor configured to reduce the value of the charging current with increasing temperature.

6. The switching power supply according to claim 1, wherein the startup circuit includes a resistor divider network having an intermediate node coupled to a base of the bipolar transistor to control conduction of the enabling current, the resistor divider connected between the input voltage and a reference node and generating a voltage sensing signal on the intermediate node, and wherein the powered control circuitry is configured and operative to use the voltage sensing signal to represent the input-side DC voltage in controlling operation of the switching/control circuitry.

7. The switching power supply according to claim 6, wherein the resistor divider network includes a thermistor having a resistance varying with temperature, the thermistor being configured and arranged to control biasing of the emitter-switched current source to reduce a level of the charging current with increasing temperature.

8. The switching power supply according to claim 1, wherein the normally on transistor is a depletion-mode field-effect transistor.

9. The switching power supply according to claim 1, wherein the generator is a passive circuit configured and operative to generate an analog voltage signal increasing during the startup period and being taken as the inhibitory control signal when the auxiliary voltage reaches the startup value.

10. The switching power supply according to claim 1, wherein the generator is an active circuit configured and operative to generate a binary voltage signal transitioning at an end of the startup period to a first binary voltage taken as the inhibitory control signal.

11. The switching power supply according to claim 10, wherein the active circuit includes a microcontroller.

12. The switching power supply according to claim 1, further including rectification circuitry configured and operative to generate the input-side DC voltage from AC source voltage supplied thereto.

13. The switching power supply according to claim 1, further including a transformer having primary and secondary windings, the primary winding being coupled to receive the input-side DC voltage, the secondary winding coupled to an output of the power supply to provide output power at a DC output voltage, and wherein the power magnetic includes an auxiliary winding of the transformer.

14. The switching power supply according to claim 1, wherein the generator of the inhibitory control signal is realized by a microcontroller executing a processing routine responsible for generating the inhibitory control signal during the startup period.

15. The switching power supply according to claim 1, wherein the switching/control circuitry generates an error voltage used to set operating duty cycle to maintain the desired output voltage, the error voltage increasing to a saturation level in the event of an overload condition in which the output voltage drops below a predetermined reference value, and wherein the emitter-switched current source is controlled (a) to be maintained in a non-conducting condition until a desired trough of the auxiliary voltage is reached after the switching power supply has turned off due to the overload condition, and (b) at the desired trough, to become conducting so that energy in the auxiliary capacitor is replenished and the switching power supply attempts a normal startup.

16. The switching power supply according to claim 15, wherein the turning off and attempted startup of the power supply are repeated multiple times in a hiccup mode of operation, the hiccup mode being one mode selectable by a microcontroller that generates the inhibitory control signal by executing a processing routine during the startup period, and wherein the microcontroller can separately select a non-hiccup mode in which the auxiliary voltage is prevented from reaching the desired trough value under circumstances in which the power supply is required to sustain its output voltage, the non-hiccup mode being effected by repetitively pulsing the startup current source to maintain the auxiliary voltage above a predetermined threshold and being selected based on whether the error voltage is at the saturation level.

* * * * *